(12) United States Patent  (10) Patent No.: US 12,508,540 B2
Thompson et al.  (45) Date of Patent: *Dec. 30, 2025

(54) ELECTROCHEMICAL CELL, METHOD AND APPARATUS FOR CAPTURING CARBON DIOXIDE FROM FLUE GAS AND DECOMPOSING NITROSAMINE COMPOUNDS

(71) Applicant: University of Kentucky Research Foundation, Lexington, KY (US)

(72) Inventors: Jesse G. Thompson, Lexington, KY (US); James Landon, Lexington, KY (US); Xin Gao, Lexington, KY (US); Kunlei Liu, Lexington, KY (US); Keemia Abad, Lexington, KY (US); Saloni Bhatnagar, Lexington, KY (US)

(73) Assignee: University of Kentucky Research Foundation, Lexington, KY (US)

( * ) Notice: Subject to any disclaimer, the term of this patent is extended or adjusted under 35 U.S.C. 154(b) by 496 days.

This patent is subject to a terminal disclaimer.

(21) Appl. No.: 17/881,448

(22) Filed: Aug. 4, 2022

(65) Prior Publication Data

US 2022/0370954 A1  Nov. 24, 2022

Related U.S. Application Data

(63) Continuation-in-part of application No. 16/458,611, filed on Jul. 1, 2019, now Pat. No. 11,439,950.

(Continued)

(51) Int. Cl.
*B01D 53/18* (2006.01)
*B01D 53/14* (2006.01)

(Continued)

(52) U.S. Cl.
CPC ....... *B01D 53/326* (2013.01); *B01D 53/1475* (2013.01); *B01D 53/54* (2013.01);
(Continued)

(58) Field of Classification Search
CPC .. B01D 53/326; B01D 53/1475; B01D 53/54; B01D 53/62; B01D 2257/40
See application file for complete search history.

(56) References Cited

U.S. PATENT DOCUMENTS 3,475,299 A   10/1969   Slager et al.
4,455,210 A * 6/1984   Coker ................... C25B 13/00
                                               204/283

(Continued)

FOREIGN PATENT DOCUMENTS

DE    102005040468 A    3/2007
EP        2559473 A1    2/2013
(Continued)

OTHER PUBLICATIONS

English machine translation of EP2559473 Abstract.

(Continued)

*Primary Examiner* — Zulmariam Mendez
(74) *Attorney, Agent, or Firm* — Stites & Harbison PLLC; Warren D. Schickli (57) ABSTRACT

An electrochemical cell includes (a) an anode including a first liquid permeable carbon cloth carbon electrode and a first current collector, (b) a cathode including a second liquid permeable carbon cloth electrode and a second current collector, (c) a separator made from an insulating material, and (d) a current source applying an electrical current to said anode and said cathode.

11 Claims, 4 Drawing Sheets

Related U.S. Application Data (60) Provisional application No. 62/693,051, filed on Jul. 2, 2018.

(51) Int. Cl.
  *B01D 53/32* (2006.01)
  *B01D 53/54* (2006.01)
  *B01D 53/62* (2006.01)

(52) U.S. Cl.
  CPC .......... B01D 53/62 (2013.01); *B01D 2257/40* (2013.01); *B01D 2257/504* (2013.01); *B01D 2259/80* (2013.01)

(56) References Cited

U.S. PATENT DOCUMENTS

| | | | |
|---|---|---|---|
| 4,808,284 | A | 2/1989 | Bedell et al. |
| 7,074,880 | B2 | 7/2006 | Rhine et al. |
| 7,081,142 | B1 | 7/2006 | Carlson |
| 8,503,162 | B2 | 8/2013 | Seymour |
| 8,641,887 | B2 | 2/2014 | Majima et al. |
| 8,828,533 | B2 * | 9/2014 | Dai .................... C04B 38/0032 252/502 |
| 9,132,380 | B2 | 9/2015 | Menzel |
| 9,133,407 | B2 | 9/2015 | Koss et al. |
| 9,543,569 | B2 | 1/2017 | Worsley et al. |
| 9,643,125 | B2 | 5/2017 | Reddy et al. |
| 2013/0053614 | A1 | 2/2013 | Jackson et al. |
| 2013/0313475 | A1 | 11/2013 | Fischer et al. |
| 2014/0151240 | A1 | 6/2014 | Bedell et al. |
| 2014/0163299 | A1 | 6/2014 | Mitch |
| 2014/0263096 | A1 | 9/2014 | Zahlsen et al. |
| 2014/0345458 | A1 | 11/2014 | Klinker |
| 2016/0167984 | A1 * | 6/2016 | Gao .................... C02F 1/4691 204/660 |
| 2017/0080411 | A1 | 3/2017 | Fujita et al. |
| 2017/0120185 | A1 | 5/2017 | Hafner et al. |
| 2017/0325495 | A1 | 11/2017 | Bromberg et al. |
| 2018/0065105 | A1 | 3/2018 | Song et al. |
| 2018/0079660 | A1 | 3/2018 | Widger et al. |
| 2018/0372673 | A1 * | 12/2018 | Patolsky ............ G01N 33/0057 |

FOREIGN PATENT DOCUMENTS

| | | |
|---|---|---|
| GB | 1188064 A | 4/1970 |
| JP | 2003290770 A | 10/2003 |
| WO | WO2010075751 A1 | 7/2010 |
| WO | WO2014191160 A1 | 12/2014 |
| WO | WO2015161963 A1 | 10/2015 |
| WO | WO2017100867 A1 | 6/2017 |

OTHER PUBLICATIONS

English machine translation of JP2003290770 Abstract.
English machine translation of WO2010075751 Abstract.
English Machine translation of WO2014191160 Abstract.
English Machine translation of DE102005040468 Abstract.
English Machine translation of WO2015161963 Abstract.

* cited by examiner

FIG. 4

ELECTROCHEMICAL CELL, METHOD AND APPARATUS FOR CAPTURING CARBON DIOXIDE FROM FLUE GAS AND DECOMPOSING NITROSAMINE COMPOUNDS

RELATED APPLICATION

This application is a continuation-in-part of U.S. patent application Ser. No. 16/458,611, filed on Jul. 1, 2019, which claims priority to U.S. Provisional Patent Application 62/693,051 filed Jul. 2, 2018, which are hereby incorporated by reference in their entirety.

GOVERNMENT INTEREST

This invention was made with government support under grant number DE-FE0031661 awarded by the United States Department of Energy-National Energy Technology Laboratory (DOE-NETL). The government has certain rights in the invention.

TECHNICAL FIELD

This document relates generally to an electrochemical cell of unique and novel structure as well as to an apparatus and method for capturing carbon dioxide from flue gas and decomposing nitrosamine compounds.

BACKGROUND

Widespread legislation requiring the capture of greenhouse gas emissions from major industries, including fossil fuel power generation, makes the implementation of commercial carbon capture systems (CCS) imminent. Among the various capture approaches, amine-based post-combustion CCS is currently the most promising option for separating carbon dioxide from industry flue gases due to its relatively simple operation, high absorption capacity and technological maturity.

There are, however, still costs and environmental concerns that are slowing widespread implementation of this technology. The possibility of forming highly carcinogenic nitrosamines within the CCS process and their subsequent possible emission into the environment, is arguably one of the critical concerns for regulators and communities near proposed CCS property.

Nitrosamines are organic degradation products known to form from amines, particularly secondary amines or secondary amine-containing degradation products, and $NO_x$ oxidants that are common flue gas components. Nitrosamines have been detected from amine water wash sections up to 59 µM (Dai et al, Environ. Scy. Technol. 2012, 46, 9793-9801) and in emissions up to 47 ng/$Nm^3$ (Dai Silva et al, Energy Procedia, 2013, 37, 778-783). Despite unfavorable conditions from nitrosamine formation, the detection of even low levels of nitrosamines can lead to the delay of a CCS project. Nitrosamines currently represent one of the last technical challenges amine-based CCS is facing.

Current water wash technologies are located after the absorber column, and are designed to provide solvent entrainment from vapors and aerosols that contain amine solvent and degradation products from being released into the atmosphere. Some potentially dangerous compounds, such as nitrosamines, escape the bulk solvent and are very likely to be caught in the water wash section due to its high solubility. It is far more advantageous to adsorb the nitrosamine contaminants in the water wash, where the parent amine concentration is only ~0.3 wt % than to treat the bulk solvent with a concentration of 30-45 wt %. The novel technology consists of a selective electrochemical cell added to the recirculating water wash stream, to selectively remove and decompose nitrosamines while leaving other solution components intact. The water wash solution that captures water vapor and organic compounds from the absorber and recirculates within the water wash section, includes a pathway for overflowing the wash water into the absorber column for water and solvent balance. Isolation and decomposition of nitrosamine contaminants in the water wash section will maintain significantly lower nitrosamine concentrations in the water wash stream that minimizes its emission to the atmosphere and eliminates the need for a separate reactor to reduce nitrosamines with $H_2$, treat the entire bulk solvent, or dispose of the solvent or water wash as hazardous waste due to nitrosamine contamination.

This document relates to a new electrochemical cell adapted for decomposing nitrosamines and other compounds as well as to a new apparatus and new method for capturing carbon dioxide from flue gas and decomposing nitrosamines in an efficient and commercially viable manner.

SUMMARY

In accordance with the benefits and advantages described herein, a new and improved electrochemical cell is provided. That electrochemical cell comprises: (a) an anode, including a first liquid permeable carbon cloth electrode and a first current collector, (b) a cathode, including a second liquid permeable carbon cloth electrode and a second current collector, (c) a separator made from an insulating material, and (d) a current source applying an electrical current to said anode and said cathode.

The first current collector and the second current collector may be made from titanium or other appropriate material. Further, the first end plate may include a solution inlet while the second end plate may include a solution outlet.

In one possible embodiment, the anode is provided adjacent the first end plate and the cathode is provided adjacent the second end plate. Further, the separator is porous.

In another possible embodiment, the cathode is provided adjacent the first end plate and the anode is provided adjacent the second end plate. Further, the separator is porous.

In still another possible embodiment of the electrochemical cell, the first end plate has a first solution inlet and a first solution outlet, and the second end plate has a second solution inlet and a second solution outlet. In such an embodiment the first end plate is adjacent the anode, the second end plate is adjacent the cathode and the separator is nonporous.

In accordance with an additional aspect, a new and improved apparatus is provided for capturing carbon dioxide ($CO_2$) from flue gas. That apparatus comprises: (a) an absorber, including a flue gas inlet, a flue gas outlet, a $CO_2$-lean amine absorbent inlet and a $CO_2$-rich amine absorbent outlet, (b) a stripper, including a $CO_2$-rich amine absorbent inlet, a $CO_2$-lean amine absorbent outlet and a capture $CO_2$ outlet, (c) a heat exchanger adapted to receive $CO_2$-lean amine absorbent from the stripper being delivered to the $CO_2$-lean amine absorbent inlet and $CO_2$-rich amine absorbent from the absorber being delivered to the $CO_2$-rich amine absorbent inlet, (d) an electrochemical cell connected between the stripper and the absorber and adapted to remove and decompose nitrosamine compounds present in the cot-lean amine absorbent being delivered from the stripper to the cot-lean absorbent inlet.

The electrochemical cell of the apparatus may further include an anode, a cathode, a separator and a current source. The anode includes a first liquid permeable carbon cloth electrode and a first current collector. The cathode includes a second liquid permeable carbon cloth electrode and a second current collector. The separator is made from an insulating material. Further, the current source applies an electric current to the anode and the cathode. The first current collector and the second current collector may be made from titanium or other appropriate material. The apparatus may also include a first end plate, including a solution inlet, and a second end plate, including a solution outlet. In one possible embodiment, the anode is provided adjacent the first end plate, the cathode is provided adjacent the second end plate and the separator is porous. In another possible embodiment, the cathode is provided adjacent the first end plate, the anode is provided adjacent the second end plate and the separator is porous.

In still another possible embodiment of the apparatus, the apparatus includes a first end plate having a first solution inlet and a first solution outlet and a second end plate having a second solution inlet and a second solution outlet. In such an embodiment the first end plate may be provided adjacent the anode while the second end plate may be provided adjacent the cathode and the separator is nonporous.

In yet another possible embodiment, the apparatus further includes a water washing unit downstream from the flue gas outlet and a second electrochemical cell connected to the water washing unit and adapted to absorb and decompose nitrosamine compounds present in liquid separated by said water washing unit.

In accordance with still another aspect, a new and improved method is provided. That method comprises the steps of:
 (a) delivering $CO_2$-rich amine absorbent from an absorber to a stripper;
 (b) stripping $CO_2$ from said cot-rich amine absorbent in said stripper to provide a $CO_2$-lean amine absorbent;
 (c) delivering said $CO_2$-lean amine absorbent to the absorber;
 (d) passing at least a portion of the $CO_2$-lean amine absorbent being delivered to the absorber through an electrochemical cell;
 (e) decomposing nitrosamines in said $CO_2$-lean amine absorbent by applying an electric current across an anode and a cathode of said electrochemical cell;
 (f) removing $CO_2$ from a flue gas by contacting said flue gas with said cot-lean amine absorbent in the absorber;
 (g) separating water vapor and organics from flue gas discharged from said absorber;
 (h) passing at least a portion of said separated liquid through a second electrochemical cell; and
 (i) decomposing nitrosamines in said liquid by applying an electrical current across an anode and a cathode of said second electrochemical cell The method may further include the step of returning the liquid to the absorber following decomposing of the nitrosamines. In addition, the method may include applying an electric current between 5.0 $mA/cm^2$ and 10.0 $A/cm^2$ across the anode and the cathode. Further, the method may include continuously applying the electrical current of between 5.0 $mA/cm^2$ and 10.0 $A/cm^2$.

In the following description, there are shown and described several preferred embodiments of the electrochemical cell, the apparatus for capturing $CO_2$ from flue gas and the related method. As it should be realized, the electrochemical cell, the apparatus and the method are capable of other, different embodiments and their several details are capable of modification in various, obvious aspects all without departing from electrochemical cell, apparatus and method as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the electrochemical cell, the apparatus and the method and together with the description serve to explain certain principles thereof.

Reference will now be made in detail to the present preferred embodiments of the electrochemical cell, the apparatus and the method, examples of which are illustrated in the accompanying drawing figures.

DETAILED DESCRIPTION

Figure 1:
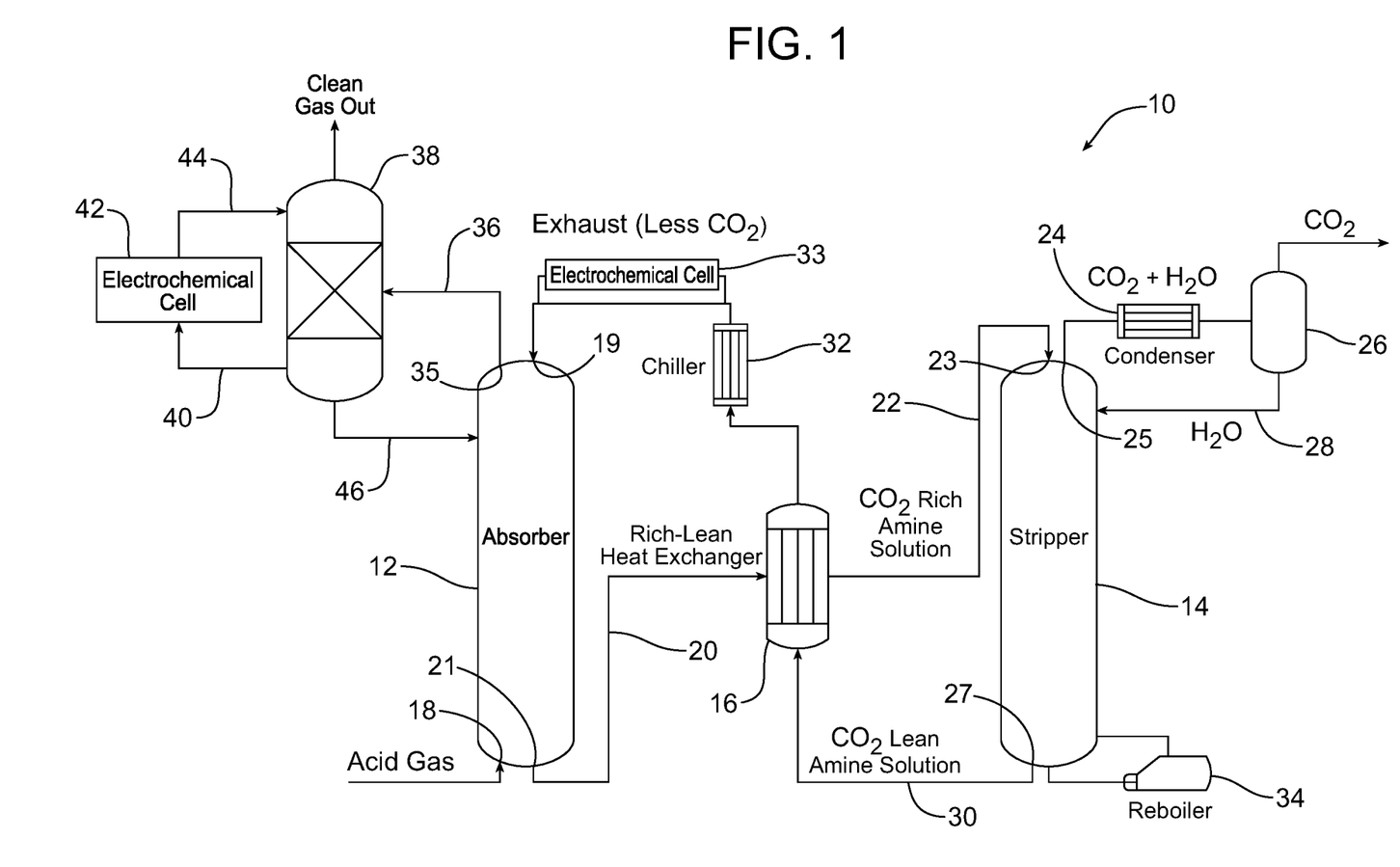
FIG. 1 is a schematic illustration of the apparatus for capturing $CO_2$ from flue gas incorporating an electrochemical cell for nitrosamine decomposition.

An apparatus 10 adapted for thermal swing processing and capturing $CO_2$ from flue gas is illustrated in FIG. 1. An aqueous amine absorbent is circulated between an absorber/absorption tower 12, a stripper 14, and a heat exchanger 16. The flue gas or acid gas, containing $CO_2$, enters the bottom of the absorber 12 at the flue gas inlet 18. The amine absorbent enters the top of the absorber/absorber tower 12 at the $CO_2$-lean absorbent inlet 19 in counter-current flow to the acid gas. As the acid gas and the amine absorbent come into contact in the absorber 12, amine absorbent removes the $CO_2$ from the gas stream. The amine absorbent, now rich in $CO_2$, is discharged from the bottom of the absorber/absorber tower 12 at the $CO_2$-rich amine absorbent outlet 21 and passed, (note action arrow 20) through the heat exchanger 16 to improve efficiency before entering the top of the stripper 14 (note action arrow 22) at the $CO_2$-rich amine absorbent inlet 23 where the amine absorbent is heated to a higher temperature. The stripper 14 removes the $CO_2$ as a gas from the amine absorbent. The $CO_2$ is passed through captured $CO_2$ outlet 25 to the condenser 24 and separated from water at the separator 26. The $CO_2$ is then subjected to downstream processing or storage while the water is returned to the stripper (note action arrow 28). The $CO_2$-lean amine solution exits the bottom of the stripper 14 through the $CO_2$-lean amine absorbent outlet 27 (note action arrow 30) and is returned to the absorber 10 by way of the heat exchanger 16 and the chiller 32. The reboiler 34 functions to prevent amine absorbent from settling to the bottom of the stripper.

In the illustrated embodiment, an electrochemical cell 33 is provided on a slip stream to the $CO_2$-lean amine absorbent return line between the stripper 14 and the absorber 12 and, more particularly, between the chiller 32 and the absorbent inlet 19. The electrochemical cell 33 functions to absorb and decompose nitrosamines in the $CO_2$-lean amine absorbent by oxidation and reduction before the slip stream liquid is returned to the return line leading to the absorbent inlet 19.

As should be appreciated, following removal of $CO_2$ in the absorber, the acid gas or flue gas is discharged from the absorber 12 through the flue gas outlet 35 and delivered (note action arrow 36) to the water washing unit 38. Water washing unit 38 is a packed column adapted to recover water vapor, amine entrainment, aerosol and amine vapor and separate the flue gas from the liquid. As illustrated by action arrow 40, a portion or slipstream of the separated liquid is delivered to a second electrochemical cell 42 where remaining nitrosamines are absorbed and decomposed by oxidation and reduction before that liquid is returned from the electrochemical cell to the water washing unit 38 at action arrow 44. Treated liquid including recovered amine absorbent is returned from the water washing unit 38 to the absorber 12 at action arrow 46.

Figure 2:
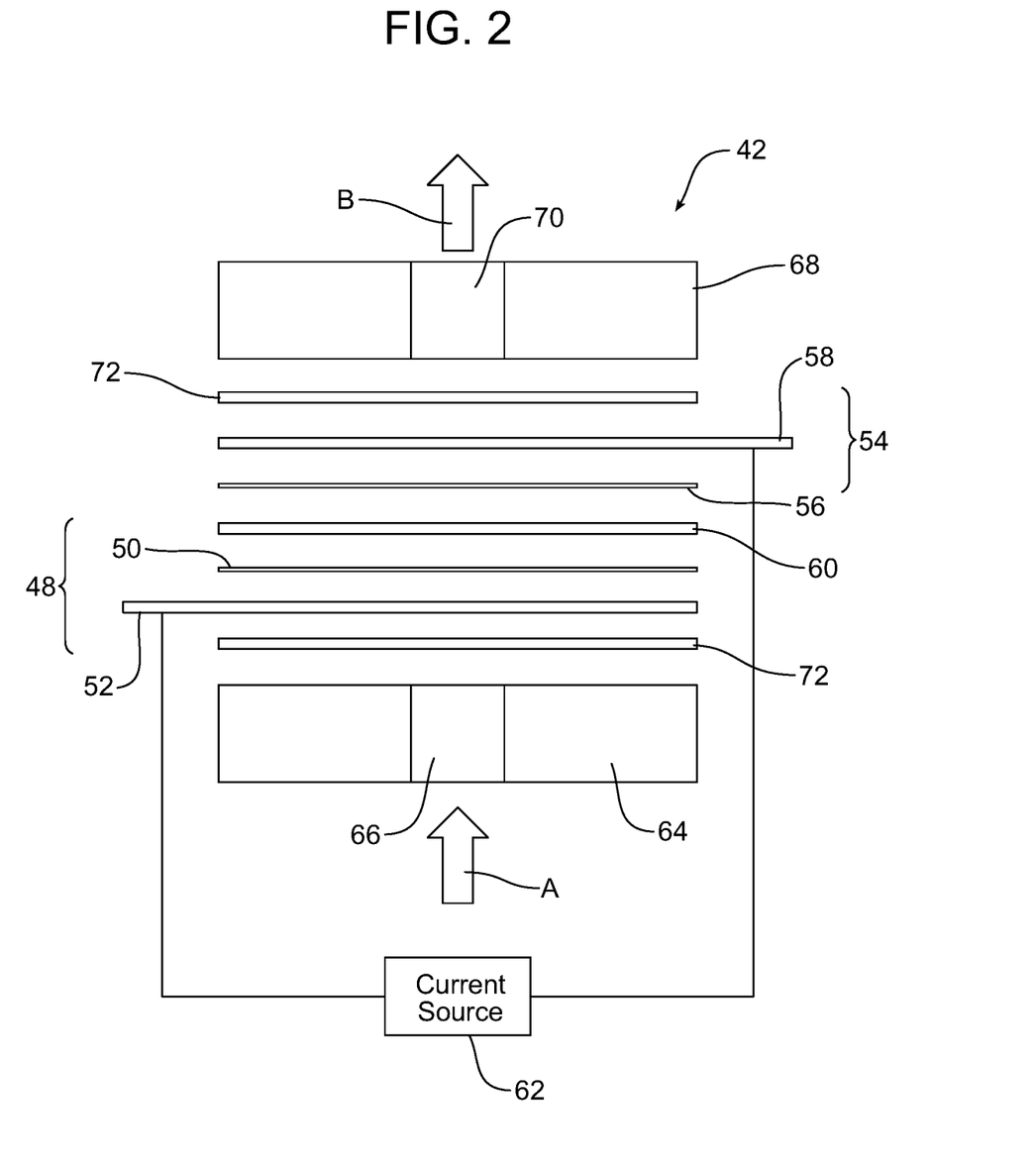
FIG. 2 is a schematic illustration of one possible embodiment of that electrochemical cell illustrated in FIG. 1.
Figure 3:
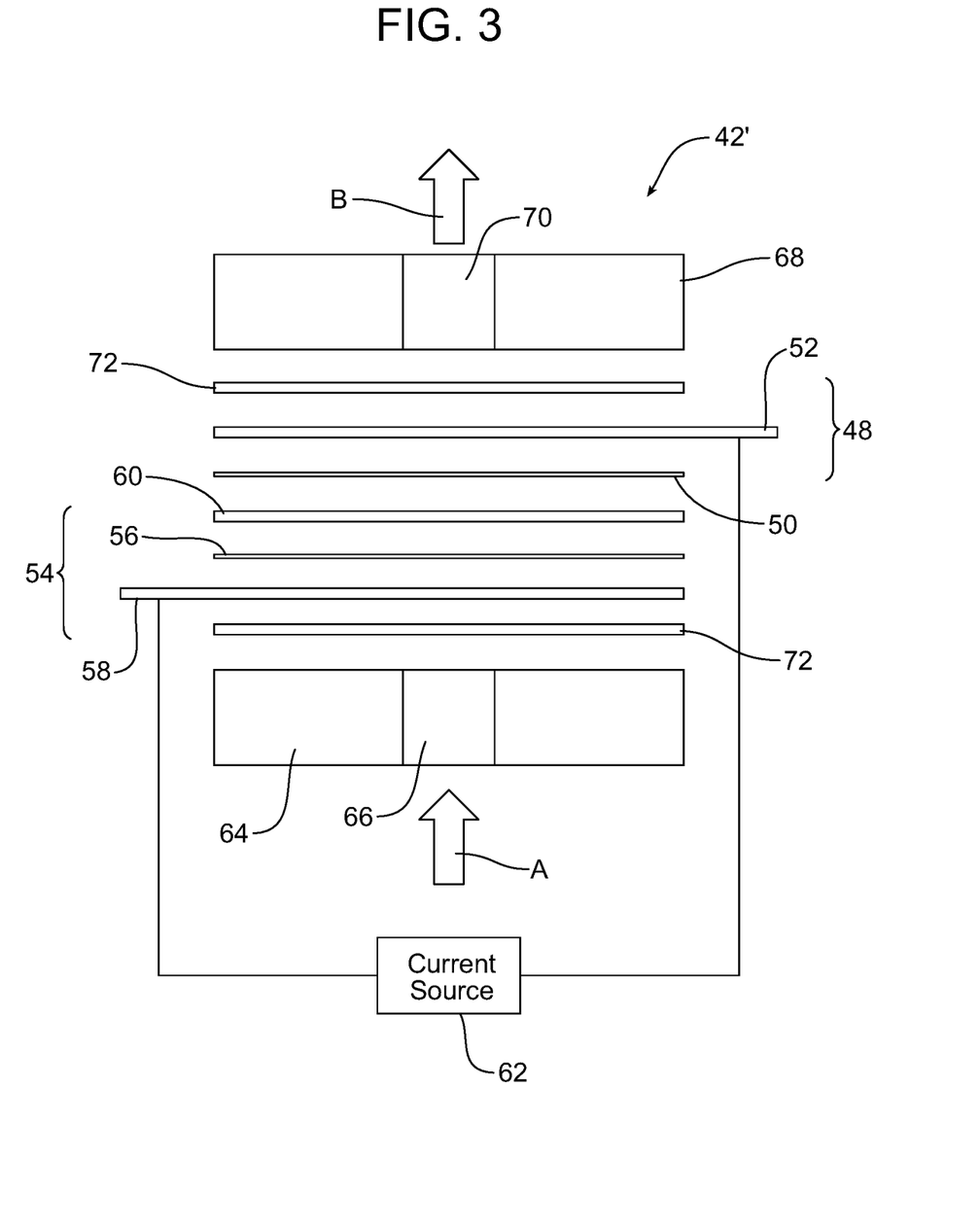
FIG. 3 is a schematic illustration of a second possible embodiment of the electrochemical cell illustrated in FIG. 1.
Figure 4:
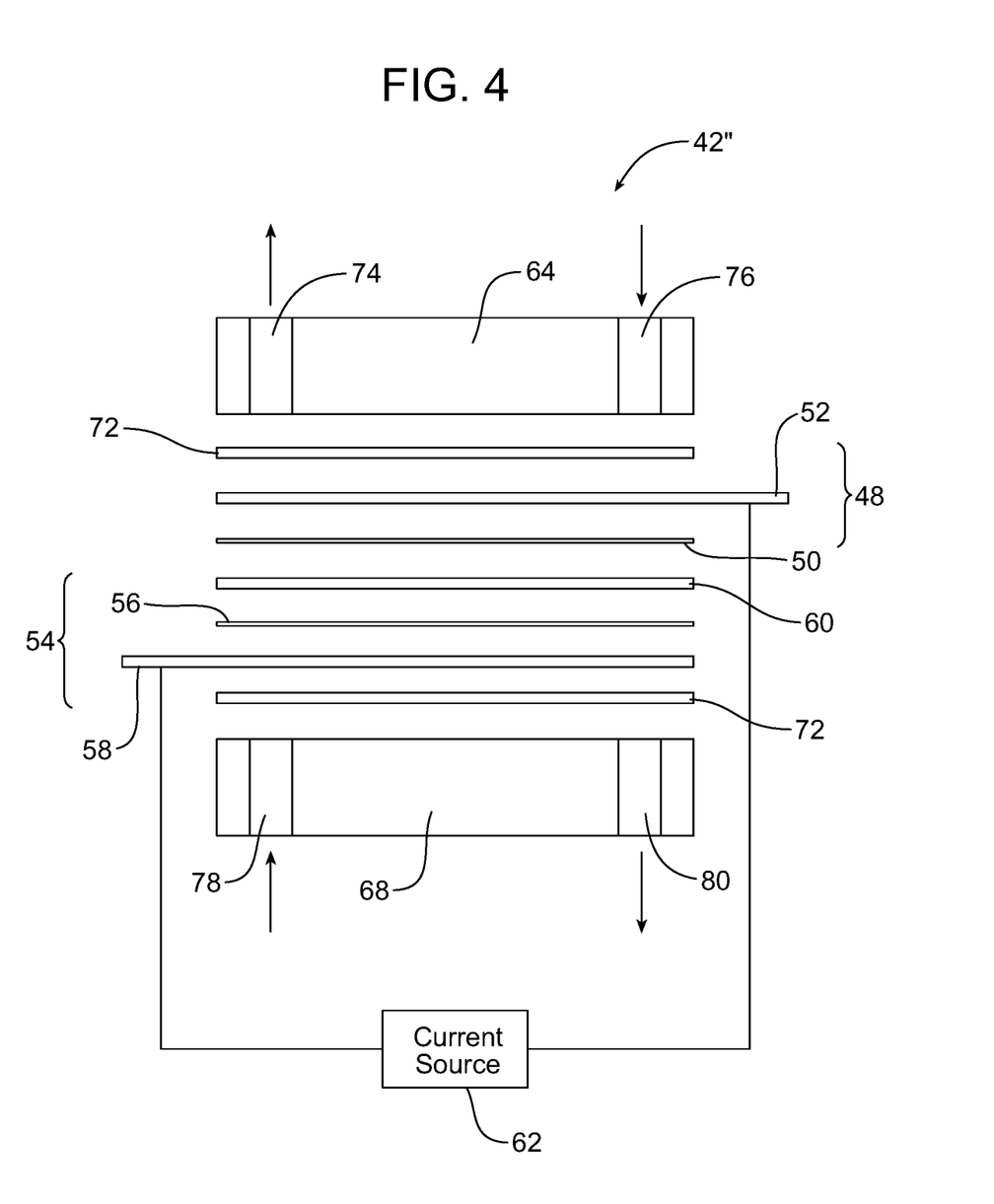
FIG. 4 is a schematic illustration of a third possible embodiment of the electrochemical cell illustrated in FIG. 1.

The electrochemical cells 33 and 42 illustrated in FIG. 1 are flow-through cells that may comprise a number of different embodiments such as those illustrated in FIGS. 2, 3 and 4.

With reference to FIG. 2, the electrochemical cell 42 includes an anode 48 including a first carbon xerogel electrode 50 and a first current collector 52. The electrochemical cell 42 also includes a cathode 54 including a second carbon xerogel electrode 56 and a second current collector 58.

The carbon xerogel electrodes 50, 56 may be made in accordance with the method described in Example 1 below. The first and second current collectors 52, 58 may be made from titanium or other appropriate electrically conducting material.

The electrochemical cell 42 illustrated in FIG. 2 further includes a separator 60 made from any appropriate insulating material such as felt, porous membranes, ion exchange membranes, cloth-like or woven materials (such as filter paper or nylon woven mesh) or silicone rubber. In addition, the electrochemical cell 42 includes a current source 62 adapted for applying an electrical current across the anode 48 and the cathode 54.

As further illustrated in FIG. 2, the electrochemical cell 42 includes a first end plate 64 including a solution inlet 66 and a second end plate 68 including a solution outlet 70. Action arrow A illustrates the liquid or solution entering the electrochemical cell 42 from the water washing unit 38 while action arrow B illustrates the liquid or solution being returned from the electrochemical cell 42 to the water washing unit following decomposition of nitrosamines. The gaskets 72 between the first end plate 64 and the anode 48 and the second end plate 68 and the cathode 54 seal the electrochemical cell 42 when the illustrated components are compressed together.

Reference is now made to FIG. 3 illustrating an alternative embodiment of the electrochemical cell identified by reference numeral 42'. The electrochemical cell 42' illustrated in FIG. 3 is identical to the electrochemical cell 42 illustrated in FIG. 2 except for the fact that the anode 48 and the cathode 54 are reversed in position so that the solution flowing through the electrochemical cell 42 contacts the cathode 54 before the anode 48 instead of the anode before the cathode as in the FIG. 1 embodiment. In both the electrochemical cell 42 illustrated in FIG. 2 and the electrochemical cell 42' illustrated in FIG. 3, the separator 60 is porous to allow the flow of liquid or solution through the electrochemical cell as illustrated by action arrows A and B.

Yet another alternative embodiment of the electrochemical cell 42" is illustrated in FIG. 4. Like structures are indicated by the same reference numbers: thus, FIG. 4 illustrates an anode 48 including a first carbon xerogel electrode 50 and a first current collector 52, a cathode 54 including a second carbon xerogel electrode 56 and a second current collector 58, a separator 60, a current source 62, a first end plate 64 and a second end plate 68.

The electrochemical cell 42" illustrated in FIG. 4 differs from the electrochemical cells 42 and 42' illustrated in FIGS. 2 and 3 in three primary respects. As shown, the first end plate 64 includes a first solution inlet 74 and a first solution outlet 76 and the second end plate 68 includes a second solution inlet 78 and a second solution outlet 80. In addition, the separator 60 in the embodiment of the electrochemical cell 42" illustrated in FIG. 4 is nonporous and does not allow liquid or solution entering and exiting the anode side of the cell through the first end plate 64 at the first solution inlet 74 and first solution outlet 76 to mix with solution or liquid entering and exiting the cathode side of the cell through the second solution inlet 78 and second solution outlet 80 in the second end plate 68.

Consistent with the above description, a method for capturing $CO_2$ from flue gas and decomposing nitrosamines comprises delivering $CO_2$-rich amine absorbent from an absorber to a stripper, stripping $CO_2$ from the cot-rich amine absorbent in the stripper to provide a $CO_2$-lean amine absorbent, delivering the $CO_2$-lean amine absorbent to the absorber and passing at least a portion of the $CO_2$-lean amine absorbent being delivered to the absorber through an electrochemical cell. The method also includes the steps of decomposing nitrosamines in said $CO_2$-lean amine absorbent by applying an electric current across an anode and a cathode of said electrochemical cell, removing $CO_2$ from a flue gas by contacting said flue gas with said cot-lean amine absorbent in the absorber, separating water vapor and organics from flue gas discharged from the absorber, passing at least a portion of the separated liquid through a second electrochemical cell; and decomposing nitrosamines in the liquid by applying an electrical current across an anode and a cathode of the second electrochemical cell.

The method may further include the step of returning the liquid to the absorber/absorber tower 12 (note action arrows 44 and 46) following the decomposing of the nitrosamines. Further, the method may include applying an electrical current of between 5.0 $mA/cm^2$ and 10.0 $A/cm^2$ across the anode 48 and the cathode 54. Further, the method may include continuously applying that electrical current.

The following experimental example illustrates how to prepare a carbon xerogel electrode for the electrochemical cell and apparatus described above.

Example 1

Carbon Xerogel Preparation—We first prepared a solution by adding 20.00 g resorcinol ($C_6H_6O_2$, Sigma-Aldrich), 29.48 g formaldehyde ($CH_2O$, 37 wt % in methanol, SigmaAldrich), 6.32 of 0.02 M $Na_2CO_3$ solution (SigmaAldrich), and 6.00 g of deionized $H_2O$ in a sealed glass bottle. The solution was stirred for 30 minutes. The resulting solution was used to infiltrate a dry carbon cloth. Subsequently, the wetted carbon cloth was immobilized between two glass slides, sealed with aluminum foil overnight, and heated at 85° C. for a period of 24 hours in air. A solvent-exchange process was performed for the polymerized sheets in which the sheets were subjected to soaking in deionized water, soaking in acetone, and air-drying. Time taken for each step was 2 hours. Finally, the dried sheets were carbonized using a quartz tube in a computer-controlled furnace at 900° C.

Oxidized Carbon Xerogel—The pristine CX sheets were dipped once into the concentrated $HNO_3$ for 30 minutes and heated at approximate 280° C. in air overnight.

Nitrogen Doped Carbon Xerogel—We first prepared a solution by adding 20.00 g resorcinol ($C_6H_6O_2$, Sigma-Aldrich), 29.48 g formaldehyde ($CH_2O$, 37 wt % in methanol, SigmaAldrich), 6.32 of 0.02 M $Na_2CO_3$ solution (SigmaAldrich), 6.00 g of deionized $H_2O$ and 3 g of Diisopropylcarbodiimide in a sealed glass bottle. The solution was sonicated for 40 minutes. The resulting solution was used to infiltrate a dry carbon cloth. Subsequently, the wetted carbon cloth was immobilized between two glass slides, sealed with aluminum foil overnight, and heated at 85° C. for a period of 24 hours in air. A solvent-exchange process was performed for the polymerized sheets in which the sheets were subjected to soaking in deionized water, soaking in acetone, and air-drying. Time taken for each step was 2 hours. Finally, the dried sheets were carbonized using a quartz tube in a computer-controlled furnace at 700° C.

In an alternative embodiment of the electrochemical cell 33, 42 or 42' useful for separating nitrosamines from water wash, nitrosamines from amine solvent, aldehydes from wash water and other purposes, the two electrodes 50, 56 are made from a liquid permeable or porous carbon cloth. Useful carbon cloth materials for construction of the first and second electrodes 50, 56 include, but are not necessarily limited to plain carbon cloth, Elat hydrophilic plain cloth and CeTech carbon cloth with microporous layer.

In some embodiments, the carbon cloth from which the electrodes 50, 56 are constructed has an air permeance of from about 2.2 to about 0.1 $L/(m^2*sec*Pa)$ and a porosity of from about 80% to about 60%. In some embodiments, yarn filaments of the carbon cloth may have a diameter of about 7.5 microns, a density of about 1.75-1.77 $g/cm^3$, a surface area of about 0.62 $g/cm^2$ and a carbon content of about 99.5%. Conductivity of the carbon cloth electrodes 50, 56 may range from about 0.398 to about 0.929 $S/cm^2$.

Operating conditions for the electrochemical cells 42, 42', including liquid permeable carbon cloth electrodes 50, 56, include not only basic and conductive as appropriate with the carbon xerogel electrodes noted above, but also acidic and conductive. The liquid permeable carbon cloth electrodes 50, 56 are stable in pH 2-12 conditions and with other compounds such as aldehydes. The mechanism for the liquid permeable carbon cloth electrodes is by reduction. The liquid permeable carbon cloth electrodes 50, 56 advantageously allow for operation over a wide range of solution conductivity. For example, the water wash solution has a conductivity of between perhaps 2-10 mS/cm while the $CO_2$-lean amine absorbent has a conductivity that can be over 30 mS/cm.

The foregoing has been presented for purposes of illustration and description. It is not intended to be exhaustive or to limit the embodiments to the precise form disclosed. Obvious modifications and variations are possible in light of the above teachings. For example, the slipstream flows through either or both of the electrochemical cells 33, 42 could instead be the entire volume. All such modifications and variations are within the scope of the appended claims when interpreted in accordance with the breadth to which they are fairly, legally and equitably entitled.

What is claimed:

1. An apparatus for capturing $CO_2$ from flue gas, comprising:
    an absorber including a flue gas inlet, a flue gas outlet, a $CO_2$-lean amine absorbent inlet and a $CO_2$-rich amine absorbent outlet;
    a stripper including a $CO_2$-rich amine absorbent inlet, a $CO_2$-lean amine absorbent outlet and a captured $CO_2$ outlet;
    a heat exchanger adapted to receive (a) $CO_2$-lean amine absorbent from said stripper being delivered to said $CO_2$-lean absorbent inlet and (b) $CO_2$-rich amine absorbent from said absorber being delivered to said $CO_2$-rich amine absorbent inlet; and
    an electrochemical cell connected between the stripper and the absorber and adapted to adsorb and decompose nitrosamine compounds present in the $CO_2$ lean absorbent being delivered from the from the stripper to the $CO_2$ lean absorbent inlet wherein said electrochemical cell includes:
    an anode including a first liquid permeable carbon cloth electrode and a first current collector;
    a cathode including a second liquid permeable carbon cloth electrode and a second current collector;
    a separator made from an insulating material; and
    a current source applying an electrical current to said anode and said cathode.

2. The apparatus of claim 1, including a first endplate including a solution inlet and a second endplate including a solution outlet.

3. The apparatus of claim 2, wherein said first current collector and said second current collector are made of titanium.

4. The apparatus of claim 3, wherein said anode is adjacent said first endplate, said cathode is adjacent said second endplate and said separator is porous.

5. The apparatus of claim 3, wherein said cathode is adjacent said first endplate, said anode is adjacent said second endplate and said separator is porous.

6. The apparatus of claim 1, including a first endplate having a first solution inlet and a first solution outlet and a second endplate having a second solution inlet and a second solution outlet wherein said first endplate is adjacent said anode, said second endplate is adjacent said cathode and said separator is nonporous.

7. The apparatus of claim 1, further including a water washing unit downstream from said flue gas outlet and a second electrochemical cell connected to the water washing unit and adapted to absorb and decompose nitrosamine compounds present in liquid separated by said water washing unit.

8. A method, comprising;
    delivering $CO_2$-rich amine absorbent from an absorber to a stripper;
    stripping $CO_2$ from said $CO_2$-rich amine absorbent in said stripper to provide a $CO_2$-lean amine absorbent;
    delivering said $CO_2$-lean amine absorbent to the absorber;
    passing at least a portion of the $CO_2$-lean amine absorbent being delivered to the absorber through an electrochemical cell;
    decomposing nitrosamines in said $CO_2$-lean amine absorbent by applying an electric current across an anode and a cathode of said electrochemical cell;
    removing $CO_2$ from a flue gas by contacting said flue gas with said $CO_2$-lean amine absorbent in the absorber;
    separating water vapor and organics from flue gas discharged from said absorber;
    passing at least a portion of said separated liquid through a second electrochemical cell; and decomposing nitrosamines in said liquid by applying an electrical current across an anode and a cathode of said second electrochemical cell.

9. The method of claim 8, including returning said liquid to said absorber following decomposing of said nitrosamines.

10. The method of claim 9, including applying an electrical current of between 5.0 mA/cm$^2$ and 10.0 A/cm$^2$ across said anode and said cathode.

11. The method of claim 10, including continuously applying said electrical current of between 5.0 mA/cm$^2$ and 10.0 A/cm$^2$.

* * * * *